(12) United States Patent
Nishikawa et al.

(10) Patent No.: US 9,236,585 B2
(45) Date of Patent: Jan. 12, 2016

(54) BATTERY BLOCK AND METHOD FOR MANUFACTURING SAME

(75) Inventors: Yukio Nishikawa, Osaka (JP); Oose Okutani, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 14/113,059

(22) PCT Filed: May 30, 2012

(86) PCT No.: PCT/JP2012/003532
§ 371 (c)(1),
(2), (4) Date: Oct. 21, 2013

(87) PCT Pub. No.: WO2012/164923
PCT Pub. Date: Dec. 6, 2012

(65) Prior Publication Data
US 2014/0045037 A1  Feb. 13, 2014

(30) Foreign Application Priority Data
May 30, 2011  (JP) .................................. 2011-120469

(51) Int. Cl.
*H01M 2/02*     (2006.01)
*H01M 2/10*     (2006.01)
(Continued)

(52) U.S. Cl.
CPC .......... *H01M 2/0277* (2013.01); *H01M 2/0267* (2013.01); *H01M 2/1077* (2013.01); *H01M 2/1094* (2013.01); *H01M 10/643* (2015.04); *H01M 10/653* (2015.04); *H01M 10/6555* (2015.04); *H01M 2/026* (2013.01);
(Continued)

(58) Field of Classification Search
CPC . H01M 2/1016; H01M 2/1022; H01M 2/105; H01M 2/1077; H01M 2/1094; H01M 2/0267; H01M 2/0277; H01M 10/642; H01M 10/653
See application file for complete search history.

(56) References Cited

U.S. PATENT DOCUMENTS 4,137,376 A * 1/1979 Clegg et al. ................... 429/104
4,546,056 A * 10/1985 Jessen et al. .................. 429/149

(Continued)

FOREIGN PATENT DOCUMENTS

CN    101621142    1/2010
JP    2000-62472   2/2000

(Continued)

OTHER PUBLICATIONS

International Search Report of PCT Application No. PCT/JP2012/003532 dated Aug. 7, 2012.

(Continued)

*Primary Examiner* — Gregg Cantelmo
(74) *Attorney, Agent, or Firm* — Wenderoth, Lind & Ponack, L.L.P.

(57) ABSTRACT

A battery block comprising: a battery case that includes a plurality of metal pipe-shaped members joined or adhered to each other; a cell accommodated inside each of the plurality of metal pipe-shaped members; and an insulating layer that covers the outer wall surface or the inner wall surface of the metal pipe-shaped members of the battery case. According to the present invention, even if unnecessary contact between battery blocks occurs in a power supply unit, a short circuit or the like does not occur.

7 Claims, 10 Drawing Sheets

(51) Int. Cl.
*H01M 10/653* (2014.01)
*H01M 10/6555* (2014.01)
*H01M 10/643* (2014.01)

(52) U.S. Cl.
CPC ........ *H01M 2/0262* (2013.01); *Y10T 29/49108* (2015.01); *Y10T 29/49115* (2015.01)

(56) References Cited

U.S. PATENT DOCUMENTS

| | | | |
|---|---|---|---|
| 5,158,841 A * | 10/1992 | Mennicke et al. | 429/120 |
| 5,510,208 A | 4/1996 | Hall et al. | |
| 2010/0119928 A1 | 5/2010 | Yoon | |
| 2010/0136404 A1* | 6/2010 | Hermann et al. | 429/120 |
| 2011/0090614 A1 | 4/2011 | Guerin et al. | |
| 2011/0223452 A1* | 9/2011 | Yoshida et al. | 429/83 |
| 2011/0267778 A1* | 11/2011 | Eckstein et al. | 361/704 |
| 2011/0274951 A1* | 11/2011 | Yasui et al. | 429/53 |

FOREIGN PATENT DOCUMENTS

| | | | |
|---|---|---|---|
| JP | 2000-90976 | | 3/2000 |
| JP | 2000-108687 | | 4/2000 |
| JP | 2000-133227 | | 5/2000 |
| JP | 2004-71168 | | 3/2004 |
| JP | 2004265743 A | * | 9/2004 |
| JP | 2005-302382 | | 10/2005 |
| JP | 2006-92935 | | 4/2006 |
| JP | 2006339017 A | * | 12/2006 |
| JP | 2007-66773 | | 3/2007 |
| JP | 2010-92860 | | 4/2010 |
| JP | 2011-508366 | | 3/2011 |
| WO | 2012/035683 | | 3/2012 |
| WO | WO 2012164828 A1 | * | 12/2012 |

OTHER PUBLICATIONS

English translation of the Chinese Office Action's Search Report issued May 21, 2015 in corresponding Chinese Patent Application No. 201280026447.5.

* cited by examiner

BATTERY BLOCK AND METHOD FOR MANUFACTURING SAME

TECHNICAL FIELD

The present invention relates to a battery block and a manufacturing method thereof.

BACKGROUND ART

A power supply apparatus (battery pack) is formed by electrically connecting battery units (battery blocks) each housing cells so as to implement a high-capacity power supply apparatus (see Patent Literature 1). Usually, a battery block includes cells and a container for housing the cells, and the container is made of resin such that the container is electrically insulated from the cells. However, the resin container has low heat-dissipating property. Accordingly, a container made of a composite material of resin and metal has been presented (see Patent Literature 2) in order to increase heat-dissipating property of the container such that heat generated by the cells under operation is dissipated and the temperature of the cells is prevented from increasing. Another container including a combination of metal heat sink and insulating material has been presented as well (see Patent Literature 3).

Other related techniques have also been presented (for example, see Patent Literatures 4 to 6).

For example, Patent Literature 4 discloses a battery housing method in which an annular space between a battery cell and a case is filled with a highly heat conductive insulating material without a gap, via a hole provided on the side of a case. The invention allows the battery cell to be fixed in a case. However, since only the annular space between the battery cell and the case is filled with the insulating material, it was difficult to firmly fix one case to another. In addition, it was difficult to prevent a short-circuit and others caused by a contact between battery blocks.

CITATION LIST

Patent Literature

PTL 1: Japanese Patent Application Laid-Open No. 2000-133227
PTL 2: Japanese Patent Application Laid-Open No. 2004-71168
PTL 3: Japanese Patent Application Laid-Open No. 2006-92935
PTL 4: Japanese Patent Application Laid-Open No. 2000-108687
PTL 5: U.S. Pat. No. 4,546,056
PTL 6: U.S. Pat. No. 5,510,208

SUMMARY OF INVENTION

Technical Problem

As described above, it is necessary for a container of a battery block to achieve both insulating property from cells and heat dissipating property. In view of this requirement, a container composed of a combination of a metal component and a resin component has been presented. However, a container for a battery unit which sufficiently takes account of problems caused by the contact of battery units (such as short-circuit) has not yet been presented.

More specifically, when the battery blocks in a power supply apparatus are electrically connected in series or in parallel, unwanted contact between the metal components of the containers for the battery blocks may cause a short-circuit, which could result in an accident. Unwanted contact between the metal components of the containers may occur when the power supply apparatus is shaken, for example. In view of the problem, it is an object of the present invention to provide a battery block which does not cause a short-circuit and others even at the time of unwanted contact between the battery blocks.

Solution to Problem

The first aspect of the present invention relates to a battery block which is described as follows:
[1] A battery block including: a battery case including a plurality of metal pipe-shaped members joined or bonded to each other; a cell housed in each of the plurality of metal pipe-shaped members; and an insulating layer that covers inner wall surfaces or outer wall surfaces of the plurality of metal pipe-shaped members;
wherein among the plurality of metal pipe-shaped members, at least a metal pipe-shaped member provided at an outer periphery of the battery block has a hole on a lateral side or a cutout at an end of the lateral side, and the insulating layer is provided continuously from a gap between the inner wall surface and the cell to the outer wall surface via the hole or the cutout.
[2] The battery block according to [1], in which the insulating layer is further provided in a gap between the outer wall surfaces of the plurality of metal pipe-shaped members.
[3] The battery block according to [1], in which in the metal pipe-shaped member provided at a center part of the battery block, the insulating layer is provided continuously from the gap between the inner wall surface and the cell to the outer wall surface via the hole or the cutout.
[4] The battery block according to [1], in which the insulating layer covers the inner wall surfaces of the plurality of metal pipe-shaped members, and the cell and the metal pipe-shaped member are not in contact with each other.
[5] The battery block according to [1], in which the battery case further includes a metal frame surrounding the plurality of metal pipe-shaped members.

The second aspect of the present invention relates to a method for manufacturing a battery block which is described as follows:
[6] A method for manufacturing a battery block including: providing a battery case including a plurality of metal pipe-shaped members joined or bonded with each other; housing a cell in each of the plurality of metal pipe-shaped members; and covering inner wall surfaces or outer wall surfaces of the plurality of metal pipe-shaped members with an insulating layer, wherein among the plurality of metal pipe-shaped members, at least a metal pipe-shaped member having a hole on a lateral side or a cutout at an end of the lateral side is provided at an outer periphery of the battery block, and the insulating layer continuous from a gap between the inner wall surface and the cell to the outer wall surface via the hole or the cutout is provided.
[7] The method for manufacturing a battery block according to [6], in which the insulating layer is formed at a temperature of 130° C. or lower.
[8] The method for manufacturing a battery block according to [6], in which the insulating layer is formed by wrapping a resin film around the outer wall surfaces of the plurality of metal pipe-shaped members or applying a resin on the outer wall surfaces and curing the resin.

[9] The method for manufacturing a battery block according to [6], in which the insulating layer is formed by injecting a resin into each of the plurality of metal pipe-shaped members in which the cell is housed and curing the resin to form the insulating layer in a gap between the inner wall surface of the metal pipe-shaped member and the cell.

[10] A method for manufacturing a battery block including:
providing a battery case including a plurality of metal pipe-shaped members joined or bonded to each other;
forming an insulating layer at an outer wall surface or an inner wall surface of the battery case; and
housing a cell in the metal pipe-shaped member.

[11] The method for manufacturing a battery block according to [10], in which the insulating layer is formed by applying a resin on the outer wall surface of the battery case or an inner wall surface of the metal pipe-shaped member and curing the resin.

[12] The method for manufacturing a battery block according to [10], in which the insulating layer is formed by forming an insulating oxide layer on the outer wall surface of the battery case or the inner wall surface of the metal pipe-shaped member.

Advantageous Effects of Invention

The battery block according to the present invention aims to achieve both the insulating property from the cell and the heat-dissipating property. In addition, the short-circuit due to unwanted contact between the battery blocks is prevented. Therefore, the power supply apparatus according to the present invention including the battery blocks is sufficiently durable even when the apparatus is used in a place subject to vibration.

DESCRIPTION OF EMBODIMENTS

Figure 1A:
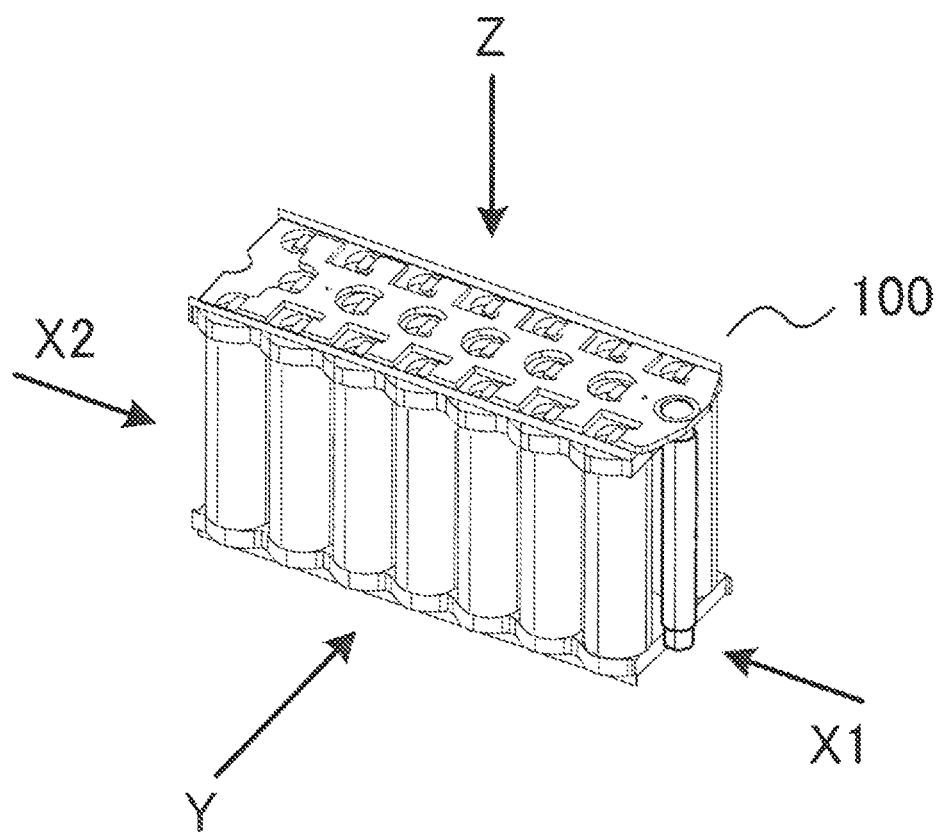
FIG. 1A is a perspective view illustrating a battery block according to Embodiment 1.

Embodiments of the present invention will be described. However, the present invention is not limited to the embodiments. Same or similar reference numerals are assigned to components having the same or similar functions in the drawings and the description for the components are omitted. Since the drawings are schematic, specific dimensions and others are to be determined with reference to the following description. Needless to say, dimensional relations and ratios may vary among the drawings.

[Battery Block]

Embodiment 1

The battery block includes a battery case and cells. The battery case includes pipe-shaped members, and each of the cells is housed in a hollow part of each of the pipe-shaped members. The cells in the battery block may have charging property. In this case, the battery block functions as a high-capacity or high-output rechargeable battery.

Figure 1B:
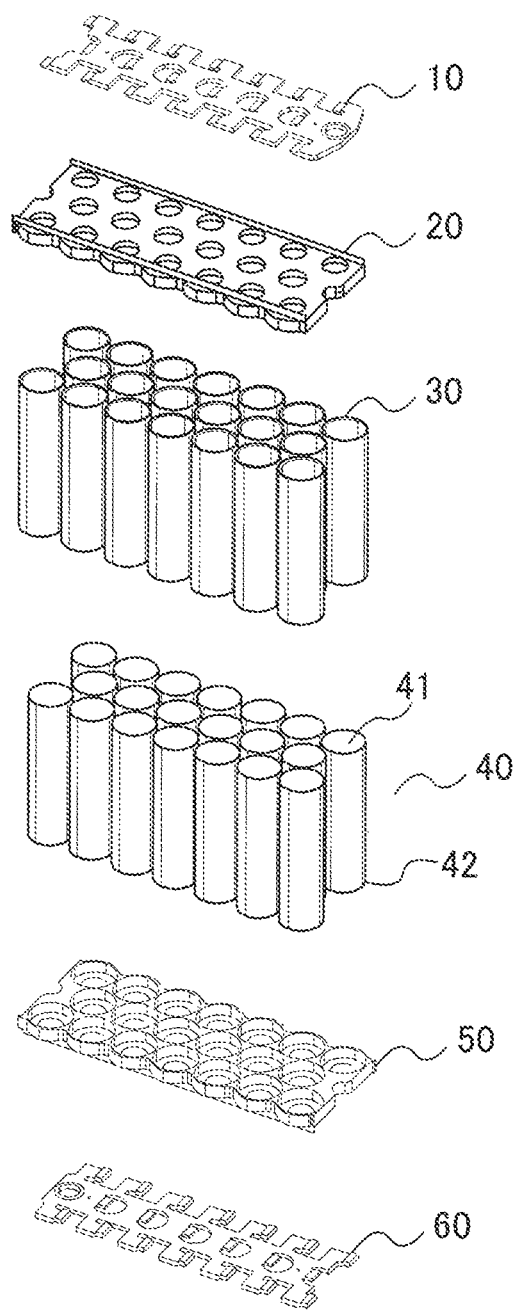
FIG. 1B is an exploded perspective view illustrating the battery block according to Embodiment 1.

FIG. 1A is a schematic diagram illustrating battery block 100. FIG. 1B is an exploded perspective view illustrating battery block 100. As illustrated in FIG. 1B, battery block 100 includes electrode plate 10, holder 20, pipe-shaped members 30, cells 40, holder 50, and electrode plate 60.

Each of cells 40 is housed in pipe-shaped member 30. Cells 40 that are housed are held by holder 20 and holder 50. One electrode 41 of the cell is connected to electrode plate 10, and the other electrode 42 is connected to electrode plate 60.

As illustrated in FIG. 1B, each of cells 40 is housed in pipe-shaped member 30. An assembly of pipe-shaped members 30 composes the battery case in the battery block according to the present invention. It is preferable that pipe-shaped members 30 are fixed while contacting each other for integration.

The pipe-shaped members composing the battery case are preferably joined to each other for integration. More specifically, the pipe-shaped members are joined on the lateral sides for integration. Pipe-shaped members 30 may be welded or brazed to each other, or adhered to each other by an adhesive or others. The number of the pipe-shaped members in one battery case may be two or more, and not particularly limited.

Figure 2A:
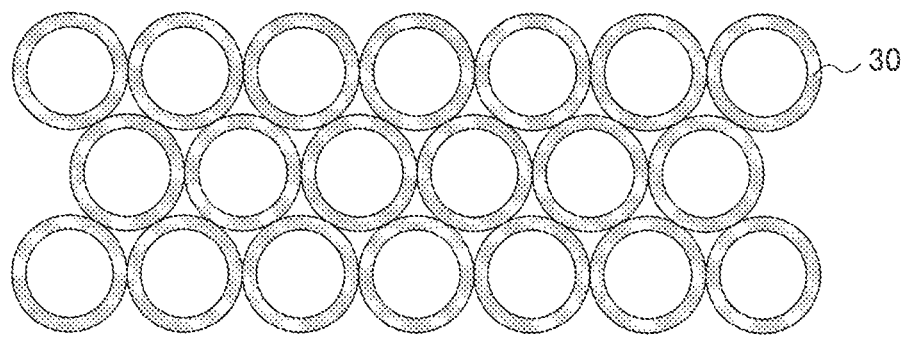
FIG. 2A is a top view illustrating a battery case without a frame for the battery block according to Embodiment 1.
Figure 2B:
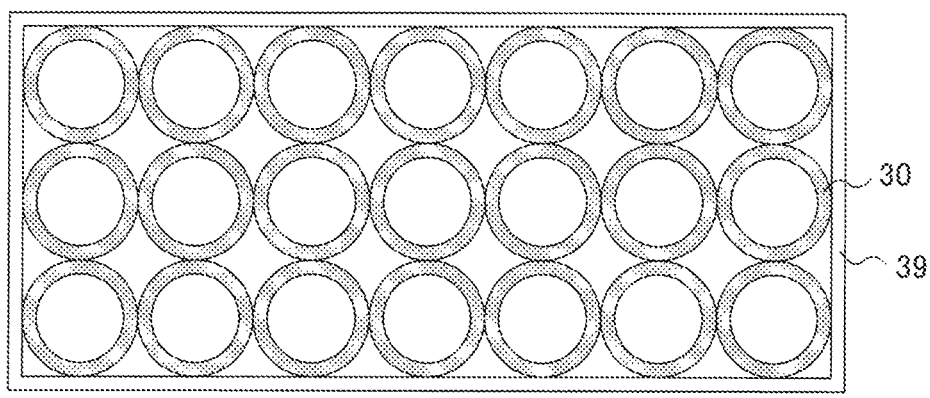
FIG. 2B is a top view illustrating a battery case with a frame for the battery block according to Embodiment 1.

As illustrated in FIG. 2A, the battery case may not further include frame 39 surrounding pipe-shaped members 30 that are integrated. Alternatively, as illustrated in FIG. 2B, the battery case may include frame 39. The frame may be made of metal. Components for connecting the battery blocks or components for connecting the battery block to external components may also be included in the battery case.

Pipe-shaped member 30 may be a circular pipe, or a polygonal pipe such as a quadrilateral pipe. The inside of the pipe-shaped member is hollow along the axial direction of the pipe. Cell 40 is housed in each pipe-shaped member 30. Cell 40 is usually cylindrical; however, may also be prism-shaped.

Figure 3A:
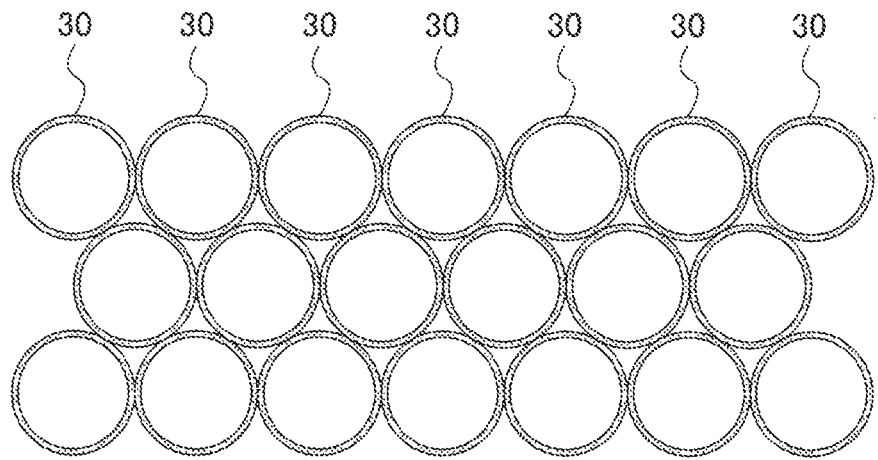
FIGS. 3A and 3B illustrate an example of arrangement of pipe-shaped members in the battery case in the battery block.
Figure 3B:
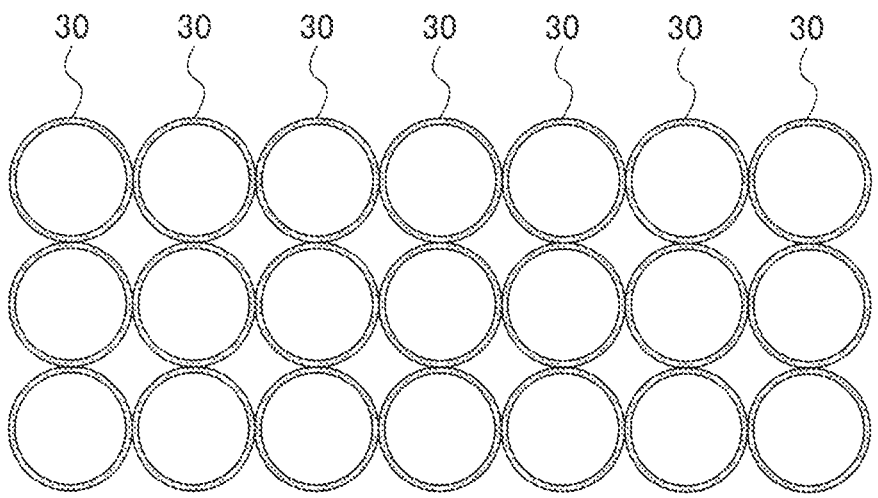

Pipe-shaped members 30 are preferably integrated such that pipe-shaped members 30 contact with each other. The arrangement of pipe-shaped members 30 is not particularly limited. For example, when pipe-shaped members 30 are circular pipes, pipe-shaped members 30 may be arranged in a close-packed structure as illustrated in FIG. 3A, or in a square array as illustrated in FIG. 3B.

Figure 4A:
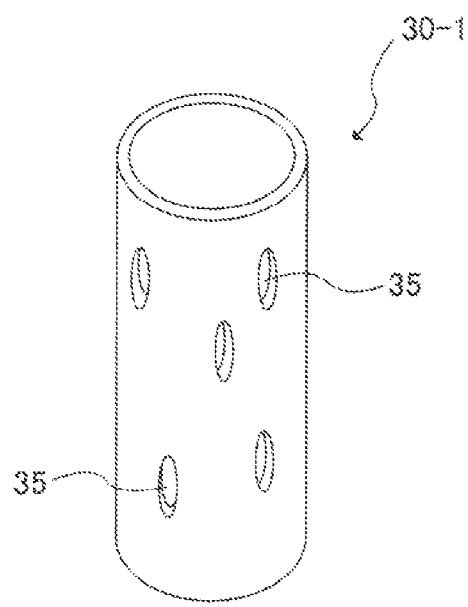
FIG. 4A is a schematic view illustrating a pipe-shaped member having a hole.
Figure 4B:
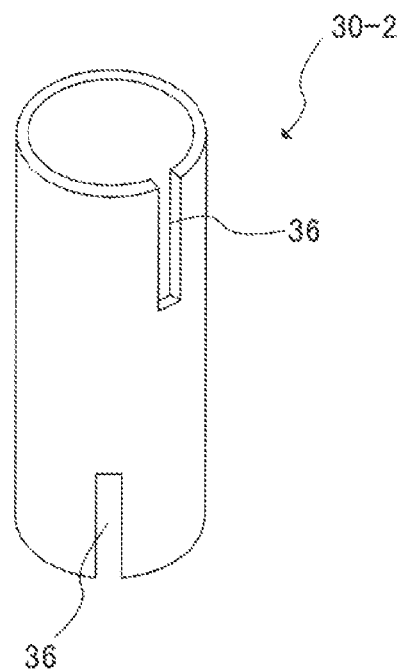
FIG. 4B is a schematic view illustrating a pipe-shaped member having a cutout.

Pipe-shaped member 30 may have a hole or a cutout on the lateral side. FIG. 4A illustrates pipe-shaped member 30-1 having hole 35. FIG. 4B illustrates pipe-shaped member 30-2 having cutout 36. The hole or cutout may serve as an inlet for injecting resin into the pipe-shaped member.

Pipe-shaped member 30 is made of metal. The metal composing pipe-shaped member 30 is preferably metal having high thermal conductivity, such as aluminum, copper, brass, stainless steel, an alloy thereof, or a laminate thereof. Pipe-shaped member 30 is preferably made of aluminum for a lightweight pipe-shaped member.

The thickness of the plate composing pipe-shaped member 30 is preferably 0.2 mm to 0.8 mm, and is 0.4 mm, for example. A thinner plate is preferable for reducing the weight of the pipe-shaped member; however, desirable strength cannot be achieved if the plate is excessively thin.

Figure 5A:
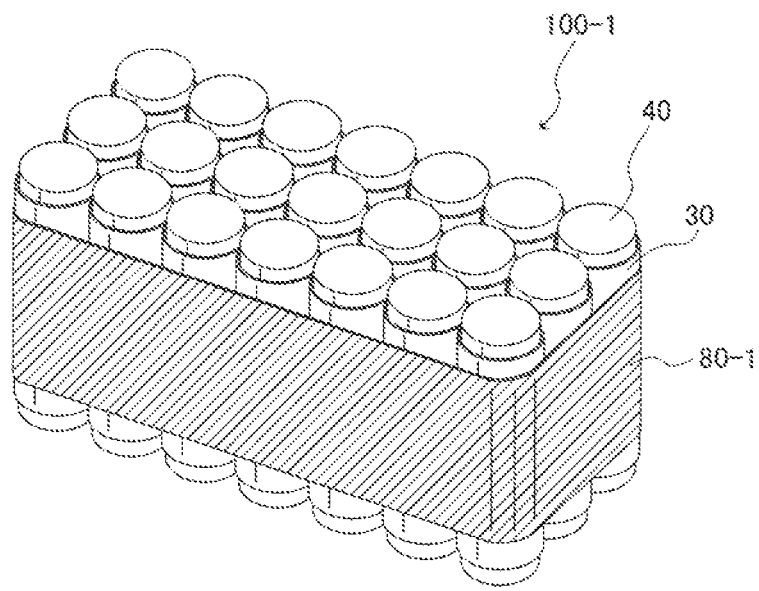
FIGS. 5A and 5B are schematic views illustrating battery blocks according to Embodiment 1.
Figure 5B:
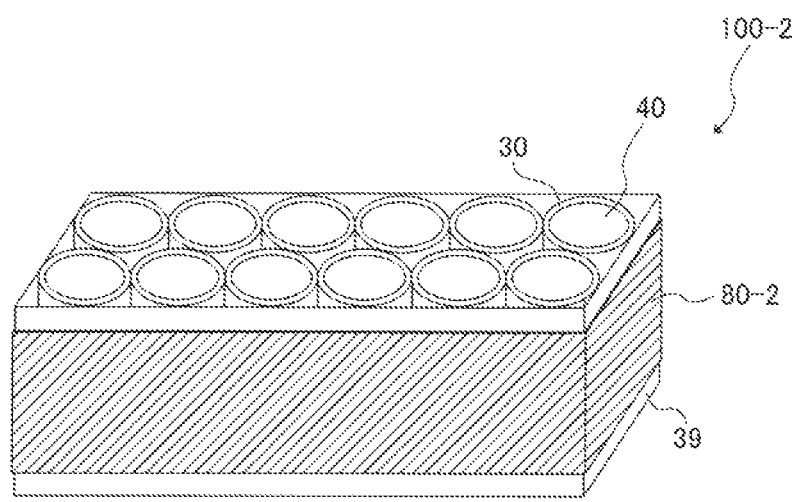
Figure 6:
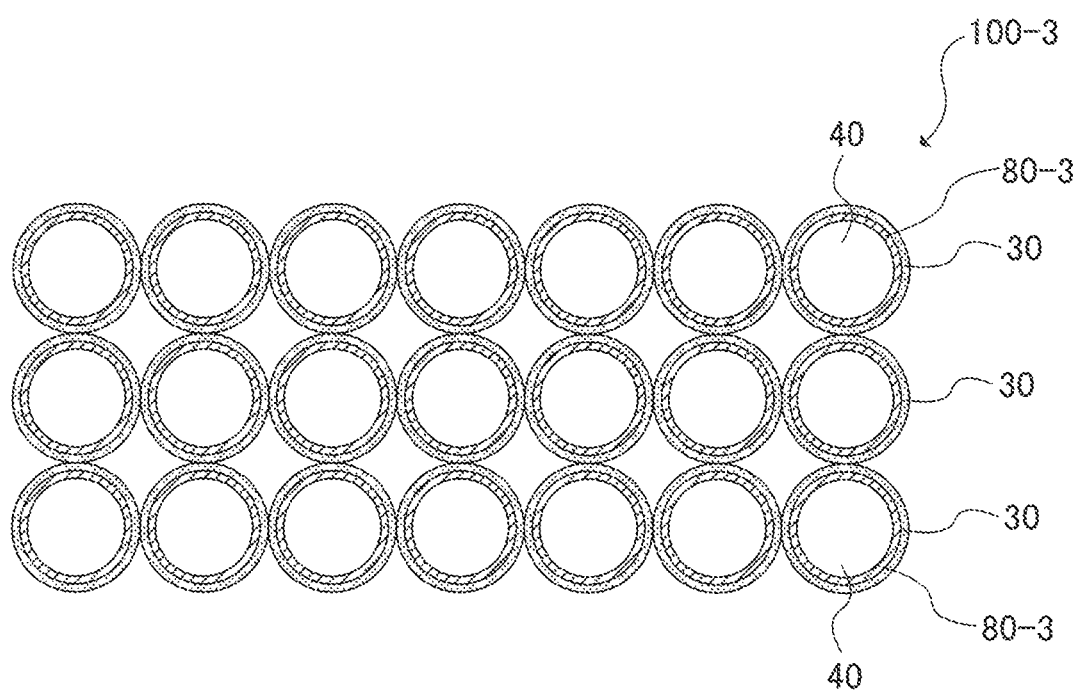
FIG. 6 is a top view illustrating an example of the battery block.
Figure 7:
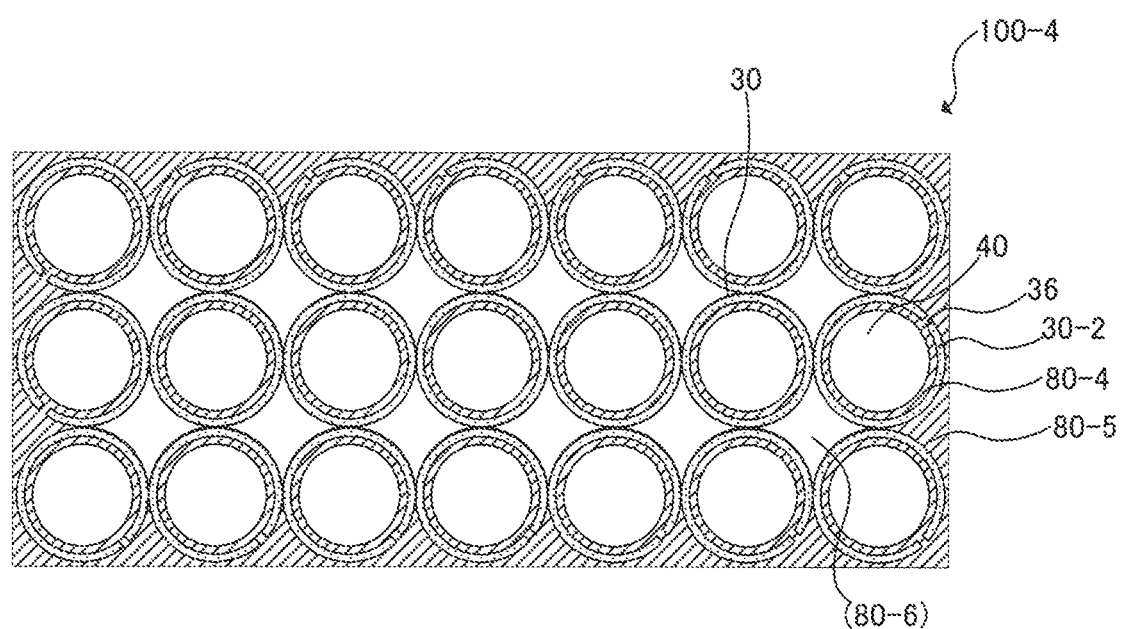
FIG. 7 is a top view illustrating a battery block according to Embodiment 2.
Figure 8:
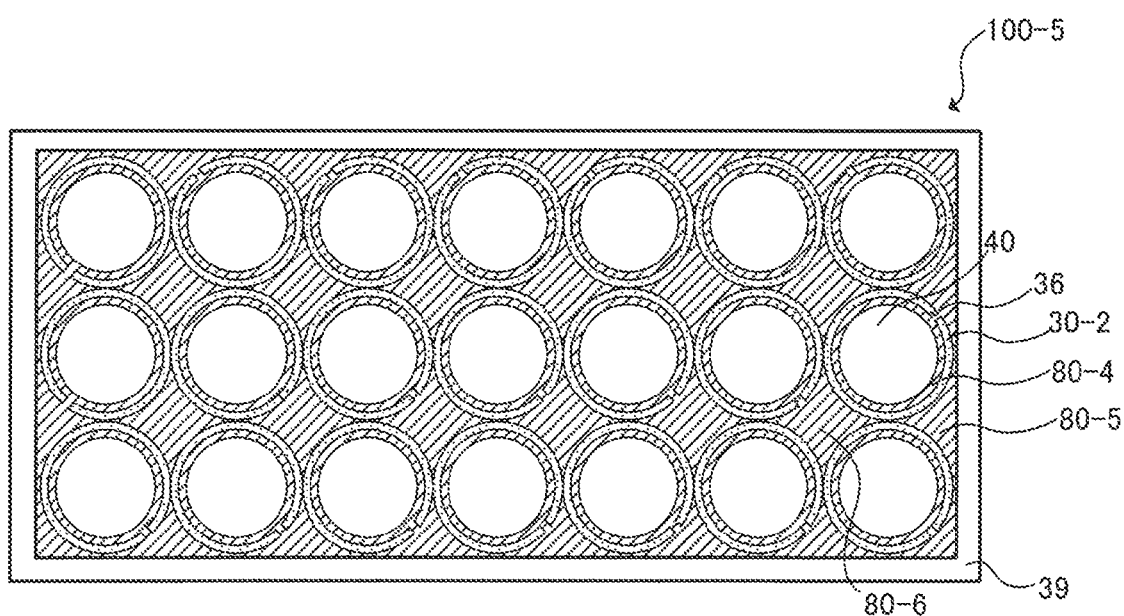
FIG. 8 is a top view illustrating an example of a battery block according to Embodiment 2.

The battery case in the battery block preferably includes an insulating layer. More specifically, as illustrated in FIG. 5A, the battery case includes an insulating layer covering an external wall surface of the assembly of the metal pipe-shaped members. However, the arrangement of the insulating layer is not limited to this example. For example, as illustrated in FIG. 5B, an insulating layer covering the outer circumferential surface of the frame surrounding the assembly of the metal pipe-shaped member may be provided. Alternatively, an insulating layer covering an inner wall surface of the metal pipe-shaped member may be included, as illustrated in FIG. 6. Alternatively, an insulating layer may be provided in the gap between the metal pipe-shaped members, as illustrated in FIG. 7 and FIG. 8.

The insulating layer is typically a layer including an insulating resin. Examples of a preferable insulating resin include polyimides, epoxy resins, polyesters, and polyolefins such as polypropylene. The insulating resin may be a thermal-resistant adhesive including silica powder or zirconia powder. Alternatively, the insulating layer may be a metal oxide layer. For example, when pipe-shaped member 30 is made of aluminum, an aluminum oxide layer may be formed by oxidizing the surface.

Battery block 100-1 illustrated in FIG. 5A includes insulating layer 80-1 covering the outer wall surface of the assembly of the metal pipe-shaped members 30 composing the battery case. Battery block 100-2 illustrated in FIG. 5B includes insulating layer 80-2 covering frame 39 surrounding the assembly of metal pipe-shaped members 30 composing the battery case. Cell 40 is housed in metal pipe-shaped member 30. As described above, since the outer circumferential surface of the battery case is covered with the insulating layer, the battery blocks do not conduct each other even when the battery blocks contact with each other.

The battery block 100-3 illustrated in FIG. 6 includes insulating layer 80-3 in a gap between the inner wall surface of metal pipe-shaped member 30 composing the battery case and cell 40. As described above, since metal pipe-shaped member 30 and cell 40 are insulated each other, a cell in one battery block and a cell in another battery block are not shorted, even when the battery blocks contact with each other.

Embodiment 2

As illustrated in FIG. 7, battery block 100-4 according to Embodiment 2 includes (i) battery cases 30 and 30-2 including metal pipe-shaped members joined or bonded with one another, (ii) cell 40 housed in each of metal pipe-shaped members 30 and 30-2, and (iii) insulating layers 80-4 and 80-5 covering the inner wall surfaces or the outer wall surfaces of metal pipe-shaped members 30 and 30-2.

As illustrated in FIG. 7, metal pipe-shaped members 30-2 arranged at least at the outer periphery of battery block 100-4 each has cutout 36 at the end of the lateral side. Insulating layer 80-5 is formed continuous from a gap between the inner wall surface and call (80-4) to the outer wall surface via cutout 36. Insulating layer 80-4 formed between the inner wall surface and the cell and insulating layer 80-5 formed at the outer periphery of battery block 100-4 are integrally formed. Accordingly, the battery blocks are securely insulated from each other. The metal pipe-shaped members are firmly fixed by integrally assembling the metal pipe-shaped members provided at the outer periphery of the battery block using the insulating layer.

Although metal pipe-shaped member 30-2 is used here, metal pipe-shaped member 30-1 having hole 35 as illustrated in FIG. 4A may also be used.

As illustrated in FIG. 8, battery block 100-5 according to Embodiment 2 may include an insulating layer in gap 80-6 formed between the outer wall surfaces of the metal pipe-shaped members. With this, the metal pipe-shaped members may be fixed more firmly. Alternatively, in the metal pipe-shaped member provided at the center part of the battery block, the insulating layer may be provided continuous from the gap between the inner wall surface and the cell to the outer wall surface via a hole or a cutout. With this, the cells are fixed more firmly. The battery case may further include metal frame 39 surrounding the metal pipe-shaped members.

Note that, it is preferable that the insulating layer covers the inner wall surface of the metal pipe-shaped member so that the cell and the metal pipe-shaped member are not in contact with each other.

[Method for Manufacturing Battery Block]

A method for manufacturing the battery block is roughly categorized into (i) forming an insulating layer after housing the cells into the battery case having the pipe-shaped members, and (ii) forming the insulating layer in the battery case having the pipe-shaped members, and then housing the cells therein.

1) When the insulating layer is formed after the cell is housed in the pipe-shaped member in the battery case It is preferable that the insulating layer is formed under the condition in which a temperature is 130° C. or lower, preferably at 80° C. or lower so as to prevent resin components inside the cell from being softened. Specific methods for forming the insulating layer include: a) wrapping a resin film around the outer wall surface of the battery case including the pipe-shaped members, or applying a resin on the outer wall surface of the battery case and curing the resin; or b) injecting resin into the pipe-shaped member in the battery case in which the cell is housed, and curing the resin.

a) The resin film may be wrapped around the outer wall surface of the battery case if the resin film is tacky. Thermal curing increases the tackiness. For example, tackiness of the thermosetting rubber-based resin can be increased by thermally curing the resin at 120° C.

For example, an adhesive resin may be injected. The injected adhesive resin may be cured at room temperature. Furthermore, thermal curing (for example, at approximately 60 to 100° C.) increases the adhesion, and reduces the time necessary for curing.

The outer wall surface of the battery case including the pipe-shaped members may be the outer circumferential surface of the assembly of the pipe-shaped members (FIG. 5A), and the outer circumferential surface of the frame of the assembly of the pipe-shaped members (FIG. 5B).

b) In order to effectively inject the resin into the pipe-shaped member of the battery case in which the cell is housed, it is preferable that the hole(s) or cutout(s) are provided in the pipe-shaped member (see FIGS. 4A and 4B), and the resin is injected therethrough.

2) When the insulating layer is formed in the battery case including the pipe-shaped members before housing the cells, c) the resin film may only have to be wrapped around the outer wall surface of the battery case including the pipe-shaped member, or the resin is applied and thermally cured by heating, or d) the resin is applied on the inner wall surface of the pipe-shaped member of the battery case and cured.

When the insulating layer is formed before housing the cell, the insulating layer may be formed by oxidizing the outer circumferential wall surface of the battery case to form an oxide layer which serves as the insulating layer. For example, when the battery case is made of aluminum, an aluminum oxide layer may be formed by anodizing the outer circumferential wall surface of the battery case.

The battery blocks according to the present invention may be used as a power supply apparatus by electrically connecting the battery blocks. The battery blocks may be electrically connected in series or in parallel. Even at the time of unwanted contact between the battery blocks, a short circuit between the battery blocks due to the contact does not occur. Accordingly, the battery blocks according to the present invention can be arranged in the proximity of each other, and may be used in an environment where the battery blocks are subject to vibration.

A method for manufacturing the battery block according to Embodiment 2 in FIG. 7 will be described with reference to FIG. 9A to FIG. 9C.

Figure 9A:
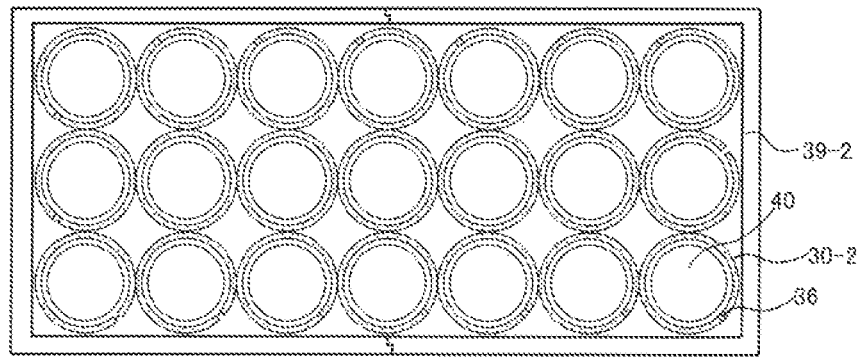
FIGS. 9A to 9C illustrate a process for manufacturing battery block according to Embodiment 2.
Figure 9B:
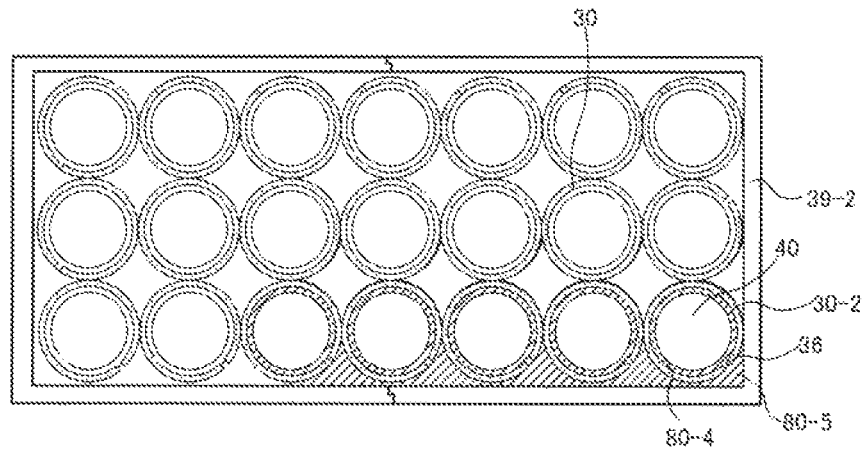
Figure 9C:
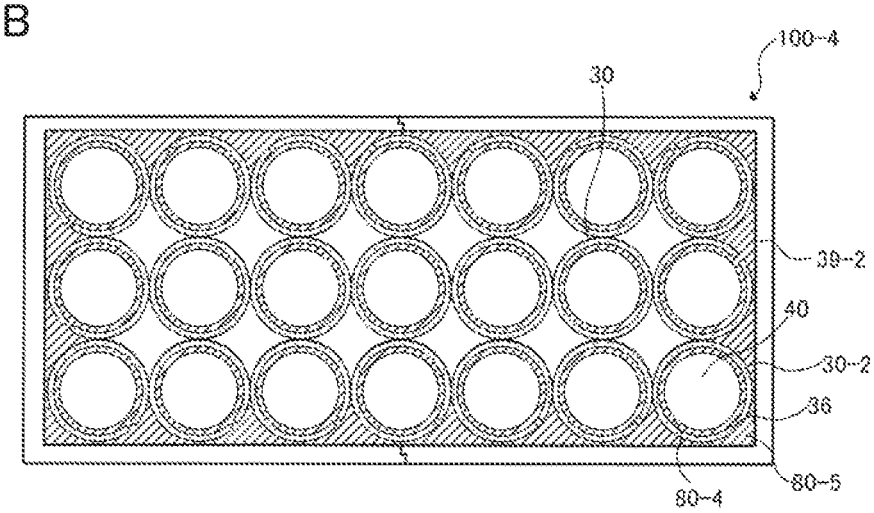

(i) Bottomed set-in metal frame 39-2 with a bottom as illustrated in FIG. 9A is provided, and a battery case including metal pipe-shaped members 30 and 30-2 that are joined or bonded with each other are provided. It is preferable that metal pipe-shaped members 30-2 each having cutout 36 at the end of the lateral side are provided at least at the outer periphery of the battery block. Next, metal pipe-shaped members 30 and 30-2 are arranged within metal frame 39-2.

(ii) After that, cells 40 are placed inside metal pipe-shaped members 30 and 30-2.

(iii) Subsequently, the inner wall surfaces or the outer wall surfaces of metal pipe-shaped members 30-2 are covered with the insulating layer. More specifically, as illustrated in FIG. 9B, insulating resin is injected into the gap between the inner wall surface of metal pipe-shaped member 30-2 and cell 40 (80-4). With this, a space continuous from the inner wall surface to the outer wall surface via cutout 36 illustrated in FIG. 4B (80-4, 80-5) in the metal pipe-shaped member 30-2 is filled with the insulating resin. The insulating resin injected into one metal pipe-shaped member 30-2 spreads the inner wall surfaces and the outer wall surfaces of the adjacent metal pipe-shaped members 30-2 via cutout 36. Accordingly, the inner wall surface and the outer wall surface of the adjacent metal pipe-shaped members 30-2 arranged at the outer periphery are covered with the insulating resin which is to be thermally cured to form insulating layers 80-4 and 80-5 in one process. In addition, by modifying the position of cutout 36 in metal pipe-shaped member 30-2 or providing a hole on the lateral side, the insulating layer may be formed, spreading the gap between the inner wall surface of metal pipe-shaped member 30 and cell 40 arranged at the center part of the battery block, as illustrated in FIG. 8.

Note that, although an application method for covering the inner wall surfaces and the outer wall surfaces of metal pipe-shaped members 30-2 with the insulating resin in one process has been described, the insulating resin for forming insulating layers 80-4 and 80-5 may be applied for each meal pipe-shaped member 30-2.

(iv) After the insulating resin is applied at the outer periphery of battery block 100-4, insulating layers 80-4 and 80-5 are formed by thermally curing the insulating resin. Frame 39-2 is subsequently removed. With the above process, battery block 100-4 according to Embodiment as illustrated in FIG. 7 is manufactured.

According to the method for manufacturing the battery block of Embodiment 2, insulating resin 80-5 may be easily arranged at the outer periphery of battery block 100-4.

The present application claims the priority of an earlier Japanese patent application filed by the same applicant, that is, Japanese Patent Application No. 2011-120469 filed on May 30, 2011, the entire content of which is incorporated by reference herein.

INDUSTRIAL APPLICABILITY

The battery blocks according to the present invention may be electrically connected to each other for use as a power supply apparatus.

REFERENCE SIGNS LIST

10 Electrode plate
20 Holder
30, 30-1, 30-2 Pipe-shaped member
35 Hole
36 Cutout
39 Frame
40 Cell
41 Electrode
42 Electrode
50 Holder
60 Electrode plate
80-1, 80-2, 80-3, 80-4, 80-5 Insulating layer
100, 100-1, 100-2, 100-3, 100-4 Battery block

The invention claimed is:

1. A battery block comprising:
   a battery case including a plurality of metal pipe-shaped members joined or bonded to each other; and
   a cell housed in each of the plurality of metal pipe-shaped members,
   wherein among the plurality of metal pipe-shaped members, at least a metal pipe-shaped member provided at an outer periphery of the battery block has a hole on a lateral side or a cutout at an end of the lateral side, and an insulating layer is provided continuously from a gap between an inner wall surface of the metal pipe-shaped member and the cell to an outer wall surface of the metal pipe-shaped member via the hole or the cutout.

2. The battery block according to claim 1,
   wherein the insulating layer is further provided in a gap between the outer wall surfaces of the plurality of metal pipe-shaped members.

3. The battery block according to claim 1,
   wherein in a metal pipe-shaped member provided at a center part of the battery block, the insulating layer is provided continuously from the gap between the inner wall surface and the cell to the outer wall surface via the hole or the cutout.

4. The battery block according to claim 1,
   wherein the battery case further includes a metal frame surrounding the plurality of metal pipe-shaped members.

5. A method for manufacturing a battery block comprising:
   providing a battery case including a plurality of metal pipe-shaped members joined or bonded with each other; and
   housing a cell in each of the plurality of metal pipe-shaped members,
   wherein among the plurality of metal pipe-shaped members, at least a metal pipe-shaped member having a hole on a lateral side or a cutout at an end of the lateral side is provided at an outer periphery of the battery block, and
   an insulating layer is provided continuously from a gap between an inner wall surface of the metal pipe-shaped member and the cell to an outer wall surface of the metal pipe-shaped member via the hole or the cutout.

6. The method for manufacturing a battery block according to claim 5,
wherein the insulating layer is formed at a temperature of 130° C. or lower.

7. The method for manufacturing a battery block according to claim 5,
wherein the insulating layer is formed by injecting a resin into each of the plurality of metal pipe-shaped members in which the cell is housed and curing the resin to form the insulating layer in a gap between the inner wall surface of the metal pipe-shaped member and the cell.

\* \* \* \* \*